Feb. 18, 1969     R. C. TRUAX ET AL     3,427,806
PRESSURIZATION SYSTEM EMPLOYING LIQUID PRESSURANT
FOR EFFECTING PROPELLANT FLOW
IN A LIQUID PROPELLANT ROCKET
Original Filed Dec. 4, 1962
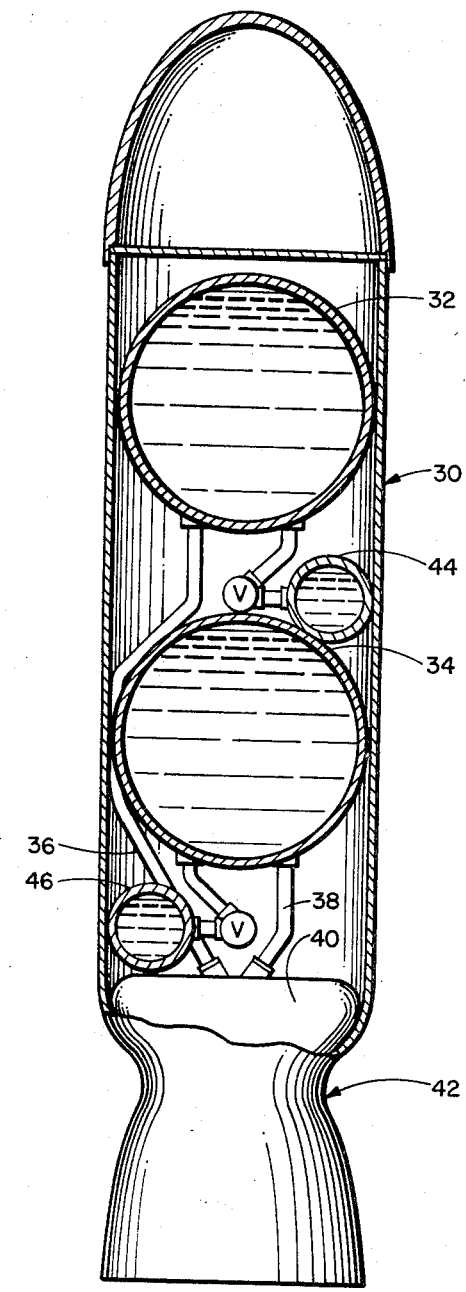
INVENTOR.
ROBERT C. TRUAX
WILLIAM J. SPROW
BY
*ATTORNEY*

United States Patent Office 3,427,806
Patented Feb. 18, 1969

3,427,806
PRESSURIZATION SYSTEM EMPLOYING LIQUID PRESSURANT FOR EFFECTING PROPELLANT FLOW IN A LIQUID PROPELLANT ROCKET
Robert C. Truax, Shingle Springs, and William J. Sprow, Fair Oaks, Calif., assignors to Aerojet-General Corporation, Azusa, Calif., a corporation of California
Original application Dec. 4, 1962, Ser. No. 242,257, now Patent No. 3,320,742, dated May 23, 1967. Divided and this application July 21, 1966, Ser. No. 599,655
U.S. Cl. 60—39.48    3 Claims
Int. Cl. F02c *3/22, 3/24;* F02k *9/02*

ABSTRACT OF THE DISCLOSURE

This disclosure concerns a pressurization system for effecting the flow of liquid propellant materials from propellant containers into the combustion chamber of a liquid propellant rocket. The pressurization system relies upon the production of a vapor pressure in the propellant containers which are filled with liquid oxidizer and liquid fuel respectively, the vapor pressure produced in the respective containers being sufficiently high to force the liquid oxidizer and the liquid fuel from the containers into the combustion chamber of the rocket. The pressurization system includes a pair of receptacles filled with a saturated liquid pressurant and respectively connected to the propellant containers. The vapor pressure in the propellant containers is produced by discharging the saturated liquid pressurant from the receptacles into the propellant containers where the saturated liquid pressurant vaporizes because the temperature of the liquid oxidizer and the liquid fuel is above the boiling point of the saturated liquid pressurant.

---

This is a division of copending application, Ser. No. 242,257, filed Dec. 4, 1962, now U.S. Patent 3,320,742 issued May 23, 1967.

This invention relates to a rocket and more particularly to a propellant supply system for a rocket motor.

Liquid propellant rockets employ a liquid feeding apparatus to force propellant from the tanks to the combustion chamber of the rocket motor. Heretofore, the liquid propellants were supplied to the rocket motor by either a pump or by pressurizing the fuel and oxidizer tanks with an auxiliary gas supply. The system of pressurizing the fuel and oxidizer tanks for the purpose of forcing the propellants to the rocket motor reduces the complexity of the propellant supply system. However, such systems require a heavy tank to contain the gas for use as a pressurizing agent. This tank and the compressed gas contained therein impose a serious weight and reliability penalty, thus adversely affecting the performance of the rocket. It is apparent that the performance of a liquid fuel rocket could be substantially improved if means could be found for supplying propellants to the rocket motor without imposing a serious weight and reliability penalty due to high pressure gas requirements. To provide such a propellant supply system comprises an important object of this invention.

This invention concerns a liquid propellant rocket wherein propellant containers respectively filled with a cryogenic or storable liquid fuel and liquid oxidizer are pressurized by introducing a saturated liquid pressurant thereinto which vaporizes to produce a vapor pressure in the propellant containers of sufficient magnitude to force the liquid fuel and the liquid oxidizer into the combustion chamber of the rocket.

It is therefore an object of this invention to provide an improved propellant supply system for a liquid propellant rocket which relies upon pressurizing the propellant containers filled with liquid propellant materials by employing a liquid pressurizing agent therefor, wherein the liquid pressurizing agent vaporizes upon being introduced into the propellant containers to produce a vapor pressure therein of sufficient magnitude to force the liquid propellant materials into the combustion chamber of the rocket. This system of pressurizing the propellant containers requires only lightweight tanks to contain the liquid pressurizing agent and favorably compares from a weight standpoint with a conventional system of the type previously described employing a gas as the pressurizing agent for the propellant containers. The latter system requires a large heavy tank to contain a supply of the gas needed for pressurization.

This and other objects of this invention will become more apparent when better understood in the light of the accompanying specification and drawings wherein:

The single figure of the drawings is a longitudinal sectional view, partially shown in elevation, of a liquid propellant rocket having a propellant supply system for delivering liquid propellant materials to the combustion chamber of the rocket, as constructed in accordance with the present invention.

Referring more specifically to the single figure of the drawings, the liquid propellant rocket indicated generally by the reference numeral 30 is provided with liquid propellant materials for imparting thrust thereto when undergoing combustion, such liquid propellant materials being respectively disposed in a liquid fuel tank or container 32 and a liquid oxidizer tank or container 34 which are suitably mounted within the outer housing of the rocket 30. The rocket 30 may be mounted in a launching silo (not shown) having electrically energized heating elements embedded therein so as to surround the housing of the rocket 30 for applying heat to the propellant tanks 32, 34 and the liquid propellant materials contained therein. Alternatively, the heating elements could be wrapped around the propellant tanks 32, 34 in the rocket 30. In this way, the temperature of the liquid propellant materials in the rocket 30 may be raised to a predetermined level before firing of the rocket, if necessary as will be hereinafter described.

Vapor is present at a definite pressure in any closed container all but filled with a liquid. If no other gas is present, this vapor pressure is the total pressure in the container. If an attempt is made to lower the vapor pressure by draining off either liquid or vapor, the vapor-liquid equilibrium will be upset and more liquid will vaporize, creating additional vapor which tends to counteract the reduction in pressure. In liquids, in order to change the liquid into gas, heat of vaporization is required. In the absence of an external source, this heat is supplied from the internal energy stored in the body of the liquid.

The magnitude of the decrease in pressure during liquid expulsion is a function of the proportion of liquid drained off, and of the properties of the specific propellant. Tests and calculations confirm that one may start with a tank almost completely filled with a liquid, expel all this liquid, and still have remaining in the tank approximately 70% of the initial pressure. Therefore, a liquid filled tank could be heated until the natural vaporization pressure of the liquid is sufficient to force liquid from the tank to the rocket motor. Consequently, using this phenomenon, it is possible to supply a rocket motor with liquid propellant materials without the use of any auxiliary pressurization components or pump components by relying solely upon heating the propellant tanks and the liquid propellant materials contained therein until the natural vaporization pressure of the liquid propellant materials is high enough to force the liquid propellant materials from the propellant tanks into the combustion chamber of the rocket.

This is the concept covered in copending application, Ser. No. 242,257, filed Dec. 4, 1962, now U.S. Patent 3,320,742 issued May 23, 1967, of which the present application is a division.

However, the utilization of natural vapor pressurization by applying heat to the liquid fuel and the liquid oxidizer comprising the propellant materials as a means of pressurizing the propellant tanks to effect the flow of the liquid fuel and the liquid oxidizer therefrom as described hereinbefore and as covered in the aforesaid U.S. Patent 3,320,742, can, under some circumstances, restrict the performance of the rocket. This is because some liquid fuels are vapor pressure limited due to low critical pressures or large reductions in liquid density. Consequently, the utilization of natural vapor pressurization by heating the liquid fuel and the liquid oxidizer to pressurize the propellant tanks for forcing the liquid propellant materials into the combustion chamber of the rocket provides the greatest rocket performance for upper stage applications. To provide a high performance and reliable booster system, the rocket 30 is provided with a secondary vapor pressurization system to pressurize cryogenic or storable liquid fuels and oxidizers in accordance with the present invention, the liquid fuel and the liquid oxidizer substantially filling the containers 32 and 34, respectively. These containers or tanks 32, 34 are connected by means of lines 36 and 38 to the combustion chamber 40 in the rocket motor 42. In addition, small receptacles or tanks 44 and 46 are connected to the fuel and oxidizer tanks 32 and 34 as shown. Tanks 44 and 46 are filled with a saturated liquid pressurant stored in a high density and near main propellant tank pressure.

The term "saturated" as employed herein refers to a liquid solution having the highest concentration of a substance in solution that can be achieved in the presence of an excess of the substance which cannot be retained in the liquid solution. In accordance with this invention, the temperatures of the liquid fuel and the liquid oxidizer in the tanks 32, 34 respectively, are maintained at a point above the temperature at which the saturated liquid pressurant vaporizes or boils. In operation, the saturated liquid pressurant is fed by means of its own vapor pressure from the tanks 44 and 46 into the bottom of the fuel tank 32 and the oxidizer tank 34, respectively. When the saturated liquid pressurant enters the bottom of these tanks 32 and 34, the higher temperature of the liquid fuel and the liquid oxidizer therein causes the saturated liquid pressurant to vaporize or boil, thereby creating a vapor pressure within the fuel tank 32 and the oxidizer tank 34. This vapor pressure within the respective fuel tank 32 and the oxidizer tank 34 is sufficiently high to force the liquid fuel and the liquid oxidizer from these tanks into the combustion chamber 40 of the rocket 30.

This vaporization of the saturated liquid pressurant as it is discharged into the liquid fuel and into the liquid oxidizer in the fuel tank 32 and the oxidizer tank 34, respectively, is achieved by maintaining the temperatures of the liquid fuel and the liquid oxidizer at a point above the temperature at which the saturated liquid pressurant vaporizes or boils, as aforesaid, which may be achieved by external application of heat to the liquid fuel and the liquid oxidizer as earlier noted to raise the temperatures of the liquid fuel and the liquid oxidizer to a predetermined level above the boiling point of the saturated liquid pressurant. In the case of such a liquid pressurant as saturated ammonia, for example, the temperature of the storable liquid fuel and liquid oxidizer in tanks 32 and 34, respectively, may be sufficiently high (ambient) so that when the saturated ammonia is admitted to the bottom of tanks 32 and 34, it immediately vaporizes and increases the pressure present from the liquid fuel and liquid oxidizer so that the resulting pressure is sufficient to force the liquid fuel and liquid oxidizer through lines 36 and 38 to the combustion chamber 40 of the rocket motor 42.

Although the use of tanks 44 and 46 imposes a slight weight penalty on the rocket 30, the increase in weight is substantially lower than the weight which would be required if high presure tanks of gas were used to force the liquid fuel and liquid oxidizer out of tanks 32 and 34. Hence, in comparison to prior pressurization methods, the use of a saturated liquid pressurant offers the advantage of a considerable reduction in the weight of the pressurization system without unduly restricting the choice of liquid propellant materials.

It is to be understood that the form of the invention herewith shown and described is to be taken as a preferred example of the same, and that various changes in the shape, size and arrangement of the parts may be resorted to without departing from the spirit of this invention or the scope of the claims.

We claim:

1. A pressurization system for a liquid propellant rocket having a combustion chamber to effect propellant flow into the combustion chamber, comprising a closed container substantially filled with a storable liquid propellant, a conduit connecting said closed container to the combustion chamber, a closed receptacle having a self-pressurized saturated liquid pressurant therein, the temperature of the liquid propellant in said container being above the temperature at which the saturated liquid pressurant boils, and means connecting said container and said receptacle together so as to enable the saturated liquid pressurant to be directly discharged from said receptacle into the liquid propellant in said container, and said saturated liquid pressurant vaporizing in response to its discharge into the liquid propellant in said container to provide a low density pressure in said container high enough to force the liquid propellant through said conduit to the combustion chamber.

2. A pressurization system for a liquid propellant rocket having a combustion chamber to effect propellant flow into the combustion chamber, comprising a first closed container substantially filled with a storable liquid fuel, a second closed container substantially filled with a storable liquid oxidizer, conduits respectively connecting said first and second closed containers to the combustion chamber, and means for increasing the vapor pressure in said first and second closed containers to a value high enough to force the fuel and the oxidizer through said conduits to said combustion chamber, said vapor pressure increasing means comprising at least one receptacle having a self-pressurized saturated liquid pressurant therein connected to said first and second containers, the temperatures of the liquid fuel in said first container and the liquid oxidizer in said second container being above the temperature at which the saturated liquid pressurant boils, the saturated liquid pressurant being directly discharged into the liquid fuel in said first container and into the liquid oxidizer in said second container, and said saturated liquid pressurant vaporizing in response to its discharge into the liquid fuel in said first container and the liquid oxidizer in said second container.

3. A pressurization system for a liquid propellant rocket having a combustion chamber to effect propellant flow into the combustion chamber, comprising a first closed container substantially filled with a storable liquid fuel, a second closed container substantially filled with a storable liquid oxidizer, conduits respectively connecting said first and second closed cointainers to the combustion chamber, and means for increasing the vapor pressure in said first and second closed containers to a value high enough to force the fuel and the oxidizer through said conduits to said combustion chamber, said vapor pressure increasing means comprising a pair of receptacles each having a self-pressurized saturated liquid pressurant therein and respectively connected to said first and second containers, the temperature of the liquid fuel in said first container being above the boiling point of the saturated liquid pressurant in the receptacle connected thereto and the temperature of the liquid oxidizer in said second container being above the boiling point of the saturated liquid pressurant in the receptacle connected thereto, the saturated liquid pressurants in said pair of receptacles being respectively directly discharged into the liquid fuel in said first container and into the liquid oxidizer in said second container, and each of said saturated liquid pressurants respectively vaporizing in response to its discharge into the corresponding one of the liquid fuel in said first container and the liquid oxidizer in said second container.

References Cited

UNITED STATES PATENTS

| | | | |
|---|---|---|---|
| 2,351,376 | 6/1944 | Ward | 222—399 |
| 2,964,916 | 12/1960 | Keeping | 60—39.48 |
| 3,092,972 | 6/1963 | Poorman | 62—48 |
| 3,136,121 | 6/1964 | Barger | 60—259 |

MARTIN P. SCHWADRON, *Primary Examiner.*

D. HART, *Assistant Examiner.*

U.S. Cl. X.R.

60—259